United States Patent
Persichini et al.

[11] Patent Number: 6,135,226
[45] Date of Patent: Oct. 24, 2000

[54] MEANS FOR SELECTIVELY DISABLING A VEHICLE

[75] Inventors: Dominic J. Persichini, Plymouth; Gary J. Isaacson, Commerce Township, both of Mich.

[73] Assignee: Quality Assurance International Corporation, Livonia, Mich.

[21] Appl. No.: 09/168,387

[22] Filed: Oct. 6, 1998

[51] Int. Cl.[7] .................................................. B60T 7/16
[52] U.S. Cl. ........................................ 180/167; 340/902
[58] Field of Search ................................ 180/167, 287, 180/169, 173; 74/483 PB; 340/825.72, 825.69, 557, 456

[56] References Cited

U.S. PATENT DOCUMENTS

| | | | |
|---|---|---|---|
| 2,138,426 | 11/1938 | Nelson | 192/4 |
| 2,824,459 | 2/1958 | Thibodeau | 74/483 |
| 3,112,004 | 11/1963 | Neaville | 180/82 |
| 3,710,122 | 1/1973 | Burcher et al. | 250/199 |
| 4,282,769 | 8/1981 | Sandrock | 74/475 |
| 4,545,459 | 10/1985 | Rochman | 180/287 |
| 4,619,231 | 10/1986 | Stolar et al. | 123/333 |
| 4,884,654 | 12/1989 | Durigon | 180/287 |
| 5,611,408 | 3/1997 | Abukhader | 180/287 |
| 5,714,807 | 2/1998 | Albanes | 307/10.2 |

FOREIGN PATENT DOCUMENTS 0 260 007 B1  6/1991  European Pat. Off.

*Primary Examiner*—Richard M. Camby
*Assistant Examiner*—G B Klebe
*Attorney, Agent, or Firm*—Gifford, Krass, Groh, Sprinkle, Anderson & Citkowski, P.C.

[57] ABSTRACT

A system for selectively disabling the operation of an automotive vehicle, e.g. during a police pursuit, is provided for use in conjunction with an automotive vehicle having a body, at least two wheels, an engine and a transmission which selectively drivingly connects the engine to the wheels. The transmission is of the type which is shiftable between a drive position in which the transmission drivingly connects the engine to at least one vehicle wheel, and a neutral position in which the transmission disengages the engine from the vehicle wheels. The system includes a sensor which senses the impingement of a laser beam and generates a disable output signal representative thereof. The sensor, furthermore, is visible exteriorly of the vehicle body and preferably at the rear of the vehicle. In response to the disable signal from the sensor, a control module generates an electric signal to the transmission to shift the transmission into its neutral position thereby disengaging the engine from the vehicle wheels.

4 Claims, 1 Drawing Sheet

MEANS FOR SELECTIVELY DISABLING A VEHICLE

BACKGROUND OF THE INVENTION

I. Field of the Invention

The present invention relates to a system for selectively disabling an operating motor vehicle.

II. Description of the Prior Art

High speed car chases have become increasingly more common in recent years. In such high speed car chases, the person in the car, oftentimes a fleeing criminal, attempts to escape a pursuing police car at very high speeds. Unfortunately, many high speed car chases result in automotive accidents and injuries not only between the fleeing car and third persons, but also between the police car and innocent bystanders. Indeed, in many cases, the pursuing police car will terminate the high speed case and let the fleeing person escape rather than risk injury to innocent bystanders.

There have been previously known proposed systems which would allow police to selectively disable the motor on the fleeing car, typically by radio signals. These previously known systems, however, have not gained widespread acceptance for use for a number of reasons.

One reason that these previously known proposed systems have not enjoyed widespread use or acceptance is that many of the vehicle operating systems, such as the steering and brakes, rely upon the operation of the engine for proper functioning. Consequently, disabling operation of the engine, while effectively stopping the fleeing car, results in an unsafe vehicle without operating brakes or operating steering. This, in turn, creates a dangerous situation and can result in accidents and injuries to innocent bystanders.

A still further disadvantage of these previously known systems is that the proposed disabling of the engine of the fleeing vehicle by radio signals was not sufficiently selective so as to be limited to the fleeing vehicle itself As such, there was a possibility of disabling the engines of cars of innocent parties not involved in the high speed chase.

SUMMARY OF THE PRESENT INVENTION

The present invention provides a system which overcomes all of the above-mentioned disadvantages of the previously known devices.

In brief, the system of the present invention is provided for use in conjunction with an automotive vehicle having a body with at least two, and typically four, wheels. An engine is mounted to the body, which includes the frame, and is selectively drivingly connected to at least one vehicle wheel through an automatic transmission.

The automatic transmission is shiftable between a drive position, in which the automatic transmission drivingly connects the engine to the vehicle wheels, and a neutral position, in which the transmission disengages the engine from the vehicle wheels. Furthermore, the automatic transmission shifts between the drive position and the neutral position, as well as between the various drive gears, in response to an electrical signal on a shift input line to the transmission.

A light sensor for sensing the impingement of a laser beam is mounted to the vehicle so that a portion of the sensor is visually open exteriorly of the vehicle body. Preferably, the sensor is placed at the rear of the vehicle body. In response to the impingement of a laser beam, the sensor generates a disable signal to a control module contained within the vehicle body.

In response to the disable signal from the sensor, the control module generates an electrical signal to the shift input line of the transmission to shift the transmission into a neutral position thus causing the car to slow down. However, since the engine is still in operation, the vehicle systems, such as the braking system and the steering system, remain completely operational thereby providing safe operation of the vehicle.

In practice, police are provided with a laser gun in the police vehicle. In the event that a car begins to flee the police, the police, by aiming the laser gun at the sensor on the rear of the vehicle, can disable the vehicle transmission of the fleeing car without affecting the operation of other cars in the vicinity.

BRIEF DESCRIPTION OF THE DRAWING

A better understanding of the present invention will be had upon reference to the following detailed description when read in conjunction with the accompanying drawing, which is a diagrammatic view illustrating a preferred embodiment of the present invention.

DETAILED DESCRIPTION OF A PREFERRED EMBODIMENT OF THE PRESENT INVENTION

Figure 1:
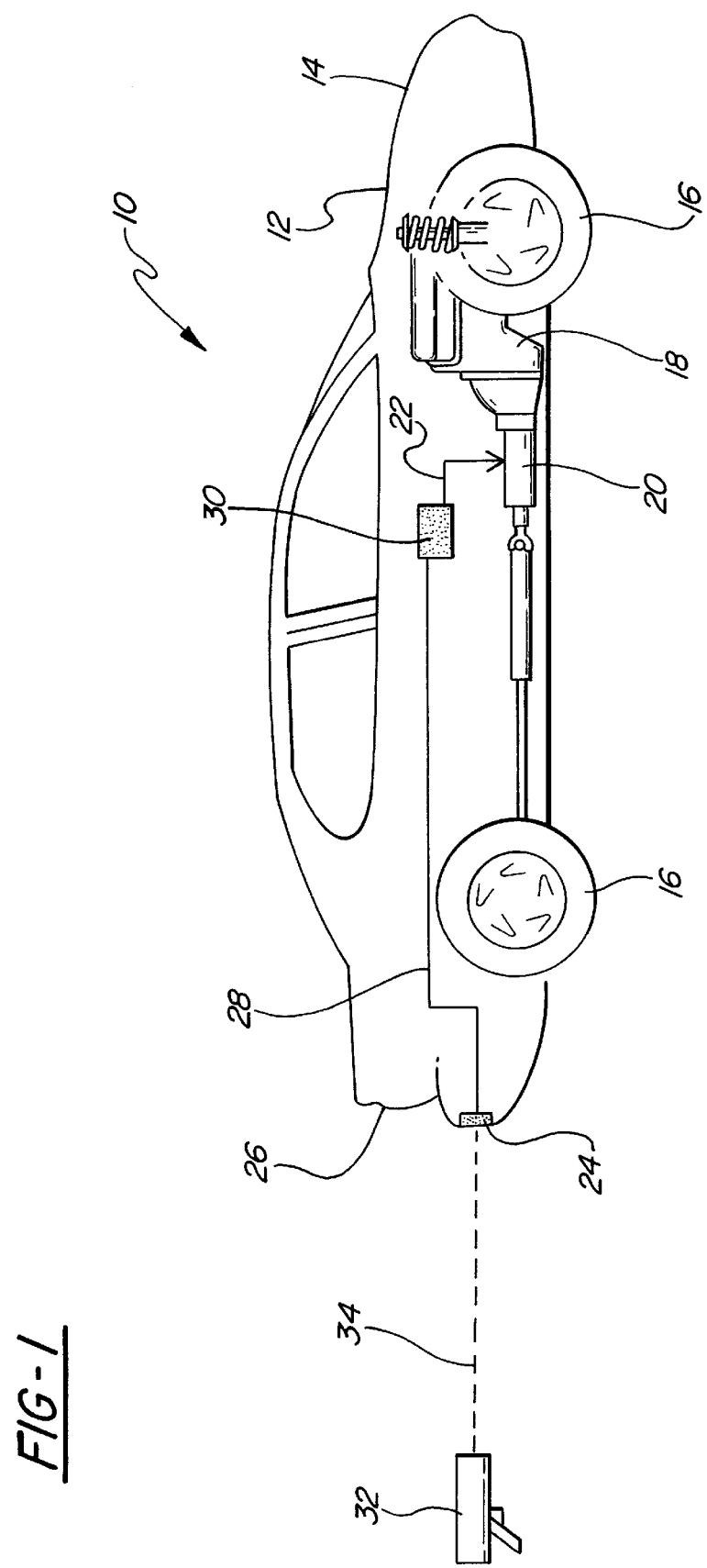

With reference to the drawing, a preferred embodiment of the system 10 of the present invention is there shown for use with an automotive vehicle 12 having a body 14, including the frame, and two or more wheels 16 rotatably mounted to the body 14. An engine 18 is contained within the body 14 and is selectively drivingly connected to the wheels 16 by an automatic transmission 20.

The automatic transmission 20 is shiftable between a drive position in which the transmission 20 drivingly connects the engine to at least one vehicle wheel 16, and a neutral position, in which the transmission disengages the engine 18 from the vehicle wheels 16. Furthermore, the transmission 20 shifts between its drive position and its neutral position, as well as the various gears in the drive position, in response to an electrical signal on a shift input line 22. Typically, the transmission 20 shifts between its neutral and drive position in response to different electric voltages on the shift input line 22.

A laser light sensor 24 is mounted to the vehicle body 14 so at least a portion of the light sensor 24 is visible exteriorly of the vehicle body 14. Preferably, as shown in the drawing, the light sensor 24 is mounted at the rear 26 of the vehicle body 14.

In response to laser impingement, the laser light sensor 24 generates a disable signal on its output line 28 to a control module 30 contained within the automotive vehicle 10. This control module 30, which comprises any conventional laser circuitry, in turn, generates an output signal to the shift input line 22 of the automatic transmission 20 which shifts the automatic transmission 20 into a neutral position thus drivingly disengaging the engine 18 from the wheels 16.

Any conventional means, such as a laser gun 32, can be used to generate the laser beam used to activate the sensor 24 and shift the transmission 20 to the neutral position as described above. Typically, the laser gun 32 is contained within a police vehicle.

Different lasers, of course, generate laser light, both visible and invisible, at different wavelengths. The output 34 from the laser gun 32 as well as the laser light sensor 24 are designed to be responsive only to a preselected laser output signal. By doing this, unintended deactivation of the transmission 20 by other lasers is precluded. Furthermore, the laser gun 32 can generate a coded or pulsed signal which is decoded by the control module 30.

In operation, in the event that the car 10 begins to flee away from police, the police can shift the transmission 20 of the fleeing car into a neutral position thus disengaging the engine 18 from the wheels 16 by merely pointing the laser gun 32 at the laser sensor 24. Since this engagement of the transmission 20 does not adversely affect the operation of the engine 18, the vehicle operating systems, such as the brake system and steering system, remain fully operational as the formerly fleeing car begins to slow.

From the foregoing, it can be seen that the present invention provides a simple and inexpensive system for police to disengage fleeing cars which overcomes all of the above-mentioned disadvantages of the previously known devices. Having described our invention, however, many modifications thereto will become apparent to those skilled in the art to which it pertains without deviation from the spirit of the invention as defined by the scope of the appended claims.

We claim:

1. For use in conjunction with an automotive vehicle having a body, at least two wheels, a transmission and an engine operatively coupled to the transmission, the transmission being shiftable between a drive position in which the transmission drivingly connects the engine to at least one vehicle wheel, and a neutral position in which the transmission disengages the engine from the vehicle wheels, a system for selectively disabling operation of vehicle comprising:

means for sensing impingement of a laser beam and for generating a disable output signal representative thereof, said sensing means being visually open exteriorly of the vehicle body, means responsive to said disable output signal for shifting the transmission into the neutral position without affecting continued of the engine.

2. The invention as defined in claim 1 wherein said sensing means is mounted to a rear portion of the vehicle.

3. The invention as defined in claim 1 wherein the transmission is an automatic transmission.

4. The invention as defined in claim 3 wherein the transmission is shiftable between the drive position and neutral position in response to an electric signal.

* * * * *